US009734327B2

(12) United States Patent
Martel et al.

(10) Patent No.: US 9,734,327 B2
(45) Date of Patent: *Aug. 15, 2017

(54) METHODS FOR RESTRICTING RESOURCES USED BY AN APPLICATION BASED ON A BASE PROFILE AND AN APPLICATION SPECIFIC PROFILE

(71) Applicant: Apple Inc., Cupertino, CA (US)

(72) Inventors: Pierre-Olivier J Martel, Mountain View, CA (US); Kelly B. Yancey, Mountain View, CA (US); Richard L. Hagy, Montara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,449

(22) Filed: May 23, 2016

(65) Prior Publication Data

US 2017/0053113 A1 Feb. 23, 2017

Related U.S. Application Data

(63) Continuation of application No. 14/292,712, filed on May 30, 2014, now Pat. No. 9,361,454.

(51) Int. Cl.
*G06F 17/00* (2006.01)
*H04L 29/06* (2006.01)
*G06F 21/53* (2013.01)
*G06F 21/62* (2013.01)

(52) U.S. Cl.
CPC .......... *G06F 21/53* (2013.01); *G06F 21/6218* (2013.01); *G06F 2221/03* (2013.01); *G06F 2221/034* (2013.01)

(58) Field of Classification Search
CPC . G06F 21/53; G06F 21/6218; G06F 2221/034
USPC ............................................................ 726/1
See application file for complete search history.

(56) References Cited

U.S. PATENT DOCUMENTS

| | | |
|---|---|---|
| 5,872,979 A | 2/1999 | Edel |
| 7,886,148 B2 | 2/2011 | Kiriansky et al. |
| 8,266,694 B1 | 9/2012 | Roy |
| 8,539,582 B1 | 9/2013 | Aziz |
| 8,825,748 B2 | 9/2014 | Sng et al. |
| 2004/0113950 A1 | 6/2004 | Brockway et al. |
| 2004/0148514 A1 | 7/2004 | Fee |
| 2005/0091658 A1 | 4/2005 | Kavalam et al. |
| 2008/0209330 A1 | 8/2008 | Cruver |

(Continued)

*Primary Examiner* — Dant Shaifer Harriman
(74) *Attorney, Agent, or Firm* — Blakely, Sokoloff, Taylor & Zafman LLP (57) ABSTRACT

In response to a request for launching an application within an operating system of a data processing system, one or more extended entitlements are extracted from the application, where the one or more extended entitlements specify one or more resources the application is entitled to access. One or more security profile extensions corresponding to the one or more extended entitlements are dynamically generated. A security profile specifically for the application is created based on the one or more security profile extensions and a base security profile that has been previously compiled, where the base security profile specifies a list of a plurality of base resources. The application is then launched in a sandboxed operating environment that is configured based on the security profile specifically generated for the application.

33 Claims, 9 Drawing Sheets

(56) References Cited

U.S. PATENT DOCUMENTS

2013/0283344 A1 10/2013 Krstic et al.
2014/0165132 A1 6/2014 Stuntebeck

```
<key> com.apple.security/exception.files.absolute.path
<array>
<string> /private/var/mobile/library/mail/ <string>  ——— 611
<string> /path 2/ <string>  ——— 612
...
<string> /path N/ <string>  ——— 613
</array>
<key>
```

METHODS FOR RESTRICTING RESOURCES USED BY AN APPLICATION BASED ON A BASE PROFILE AND AN APPLICATION SPECIFIC PROFILE

This application is a continuation of U.S. application Ser. No. 14/292,712 filed on May 30, 2014, now U.S. Pat. No. 9,361,454, which is incorporated herein by reference in its entirety.

FIELD OF THE INVENTION

Embodiments of the invention relate generally to the field of secure computing; and more particularly, to restricting resources used by an application based on a common security profile and an application specific profile.

BACKGROUND

Security concerns for all types of processor-based electronic devices, and particularly for computing devices, have become significant. While some concerns may relate to detrimental actions which may be undertaken by defective code implemented by such devices, the greater concerns relate to the ramifications of various types of attacks made upon such devices through malicious code, including code conventionally known in the field by a number of names, such as "viruses", "worms", "Trojan horses", "spyware", "malware", and others, Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

Many of these attacks are directed at computing devices, such as workstations, servers, desktop computers, notebook and handheld computers, and other similar devices. Many of these computing devices can run one or more application programs which a user may operate to perform a set of desired functions. However, such attacks are not limited to such computing devices. A broader group of various types of devices, such as cell phones; personal digital assistants ("PDAs"); music and video players; network routers, switches or bridges; and other devices utilizing a microprocessor, microcontroller, or a digital signal processor, to execute coded instructions have been the subjects of attacks by malicious code.

A number of methodologies have been used in an attempt to reduce or eliminate both attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code. However, such restrictions typically are configured statically based on a set of rules set forth in a security profile, Such statically configured rules do not always represent the dynamic conditions of an operating environment at runtime.

Typically, when an application is launched, a security profile is compiled for the application based on entitlements of the application. The security profile is then used to establish an operating environment in which the application is running and restriction on resources used by the application is enforced based on the security profile. However, compiling such a security profile consumes some resources and it takes longer to complete. The resources such as memory required to maintain the security profiles for a large number of applications may be relatively large.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a base security profile (also referred to as a sandbox profile or simply a profile) is precompiled and maintained by an operating system. The base profile contains a set of base rules that are generated based on a set of base entitlements (also referred to as base entitlements) for accessing resources (also referred to as base resources) of a data processing system. The base profile may be configured as part of standard components or configuration files that are developed and bundled with an operating system. In addition, each of the applications running within the operating system is associated with zero or more extended entitlements (also referred to as application specific entitlements). The extended entitlements may be encoded within an executable image of each application and authorized and signed by a predetermined authority.

According to one embodiment, when an application is launched by an operating system, an access control system of the operating system dynamically extracts the one or more extended entitlements from the application and compiles one or more security profile extensions having a set of one or more extended rules. The base profile and the one or more profile extensions form a logical security profile for the application, where the base rules and the extended rules are utilized to establish a sandboxed operating environment and the application is then launched within the sandboxed operating enviromnent. The resource access control is enforced by an access control system via the sandboxed operating environment.

In one embodiment, the precompiled base profile is shared by multiple applications. Each of the applications may have its own one or more profile extensions that may extend an additional entitlement from the base entitlements or alternatively, override one or more of the base entitlements. Since the base profile has been statically precompiled, when an application is launched, only the profile extension(s) may need to be compiled at runtime. As a result, the operating system may take less time to launch the application and the performance of the data processing system can be improved. Furthermore, since multiple applications share the same base profile, less memory is needed to maintain the profiles for all of the applications running within the data processing system.

Figure 1:
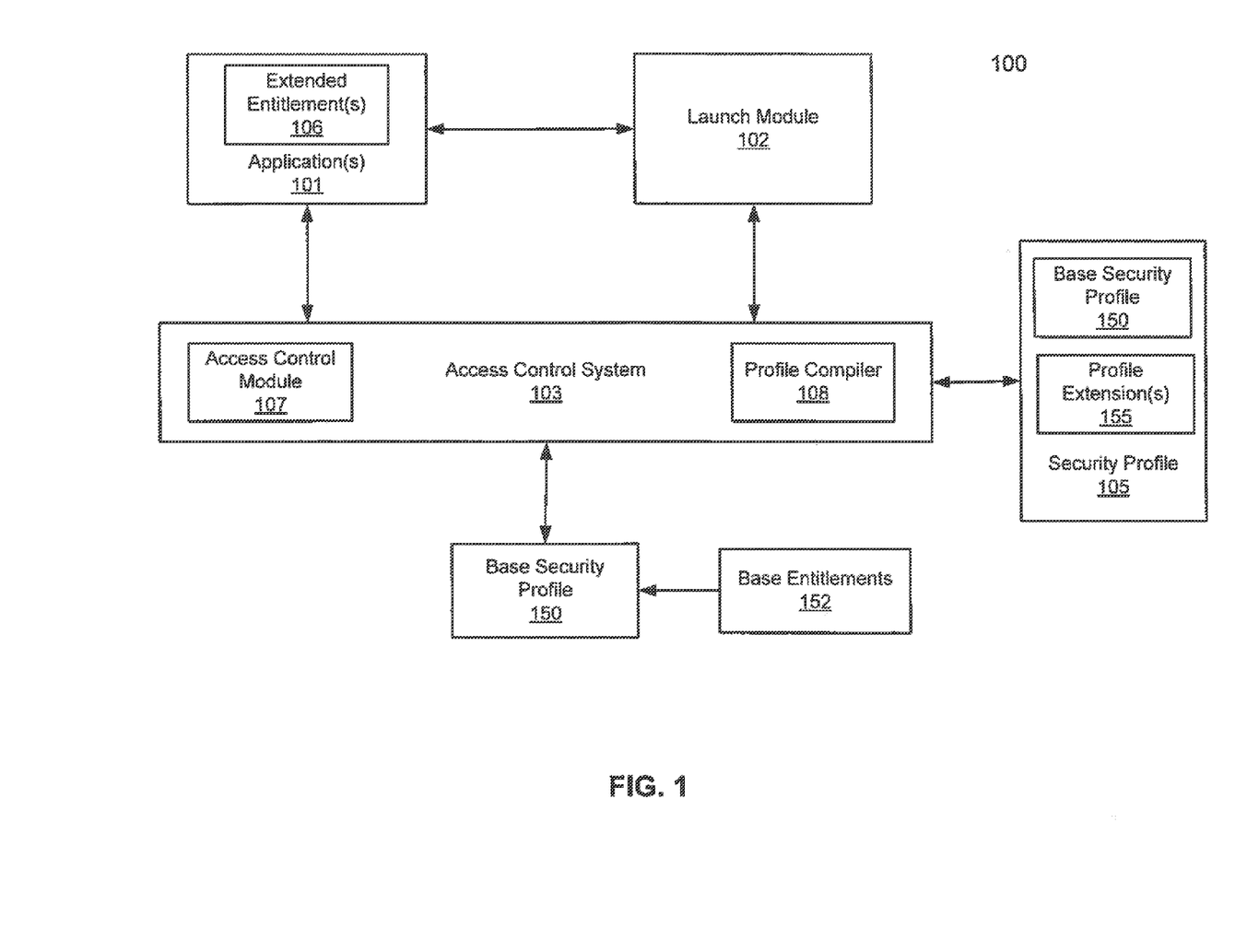
FIG. 1 is a block diagram illustrating a system for operating a program in a restricted operating environment according to one embodiment of the invention.

FIG. 1 is a block diagram illustrating a system architecture for managing applications according to one embodiment of the invention. Referring to FIG. 1, system 100 represents any kind of data processing system, such as, for example, a server, a desktop, a laptop, a tablet, or a mobile phone, etc. System 100 includes application launch module 102 and access control system 103 for launching and managing applications, such as application 101, executed within system 100 by processing resources (not shown). Processing resources may present one or more processors or processor cores. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. A processor may be a general-purpose processor such as a central processing unit (CPU).

Application launch module 102 and access control system 103 may be a part of an operating system (OS) running and executed by the processing resources within system 100. An operating system is a collection of software that manages computer hardware resources and provides common services for computer programs. The operating system is an essential component of the system software in a computer system. Application programs usually require an operating system to function. Amongst many functionalities of an operating system, scheduling is the method by which threads, processes or data flows are given access to system resources (e.g. processor time, communications bandwidth). This is usually done to load balance and share system resources effectively or achieve a target quality of service.

In addition to application launch module 102 and access control system 103, an operating system may further include other core components, such as a scheduler, a device manager, a kernel, etc. In order not to unnecessarily obscure embodiments of the present invention, these components are not shown herein. The operating system of system 100 may be any kind of operating system, such as, for example, iOS™ from Apple Inc.®, Android™ from Google®, Windows™ from Microsoft®, or other operating systems (e.g., UNIX, LINUX, real-time or embedded operating systems).

Referring back to FIG. 1, according to one embodiment, when launch module 102 receives a request for launching application 101, launch module 102 obtains and/or determines extended entitlements 106 from application 101. The extended entitlements 106 may specify one or more resources of a data processing system that application 101 is entitled to access. The entitlements represent certain functions or resources that an application is entitled to access. The entitlements may be specified by a developer during development of the application or alternatively, entitlements can be specified by an authorization entity, such as authorization server or provisioning server, which provisions or distributes the application. Such entitlements may be specified as an attribute or metadata attached to or embedded within the application, and signed by the authorization entity using a digital certificate. Examples of the resources of a data processing system may include a kernel component of an operating system, a storage location, a network interface, a peripheral device, etc.

In one embodiment, entitlements 106 may be encoded within an executable or binary image of application 101, where entitlements 106 are authorized and signed by a predetermined authority entity, such as Apple Inc. Launch module 102 can extract entitlements 106 from an executable image of application 101 without having to load or execute application 101 in the system memory. Based on the extracted entitlements 106, profile compiler 108 compiles security profile 105 for application 101, in conjunction with base security profile 150. Security profile 105 may be utilized to configure a restricted operating environment in which application 101 is executed therein.

In one embodiment, base security profile 150 may be preconfigured based on a set of base entitlements 152. Base profile 150 may be statically compiled as part of a standard system component or file of an operating system, i.e., bundled and shipped with the operating system. Base entitlements 152 may represent a set of resources that most or majority of the applications installed in the system are likely entitled to use (e.g., printing functionality). On the other hand, extended entitlements 106 may be application specific entitlements associated with application 101, which may be different from application specific entitlements of other applications. Security profile 105 includes one or more profile extensions that are dynamically compiled at launch time based on extended entitlements 106 and base security profile 150 that has been previously and statically compiled.

Base profile 150 is shared by multiple applications, while profile extension(s) 155 are specifically compiled for application 101 at runtime. Security profile 105 may be considered as a logical security profile that includes one or more profile extensions compiled based on application specific extended entitlements 106 and a reference linking with base profile 150. A profile extension is configured to extend an application specific entitlement from base entitlements 152 of base profile 150. Alternatively, a profile extension may override or supersede a base entitlement in base profile 150. For example, an email client may specify as part of its extended or application specific entitlements a specific directory or folder for storing local email data that other programs may be restricted from accessing. Similarly, a browser application may be entitled to a particular storage location for storing the browsing history that other programs may not be entitled to access. If an application does not have an extended entitlement, the application may use base profile 150 as its security profile.

Since base profile 150 has been precompiled, at launch time, only profile extensions 155 are compiled, the performance at runtime can be significantly improved. In addition, since most of the applications share base profile 150, only one instance of base profile 150 may be maintained in the system memory, in addition to the profile extensions associated with the applications. As a result, less memory is required to maintain the security profiles for all the applications running within the operating system.

Once security profile 105 has been compiled, according to one embodiment, a sandboxed operating environment can be configured based on security profile 105. Application 101 is executed within the sandboxed operating environment as a sandboxed process. Resource access is then enforced by access control module 107 via the sandboxed operating environment. During the execution of application 101, security profile 105 is used to enforce the set of rules to restrict application 101 from performing any action or accessing any resource to which application 101 is not entitled. In other words, application 101 can only access the resources that application 101 is entitled to, which may be specified in security profile 105. This in effect forces or contains application 101 to operate in a restricted operating environment, i.e., a sandbox or sandboxed operating environment.

Figure 2:
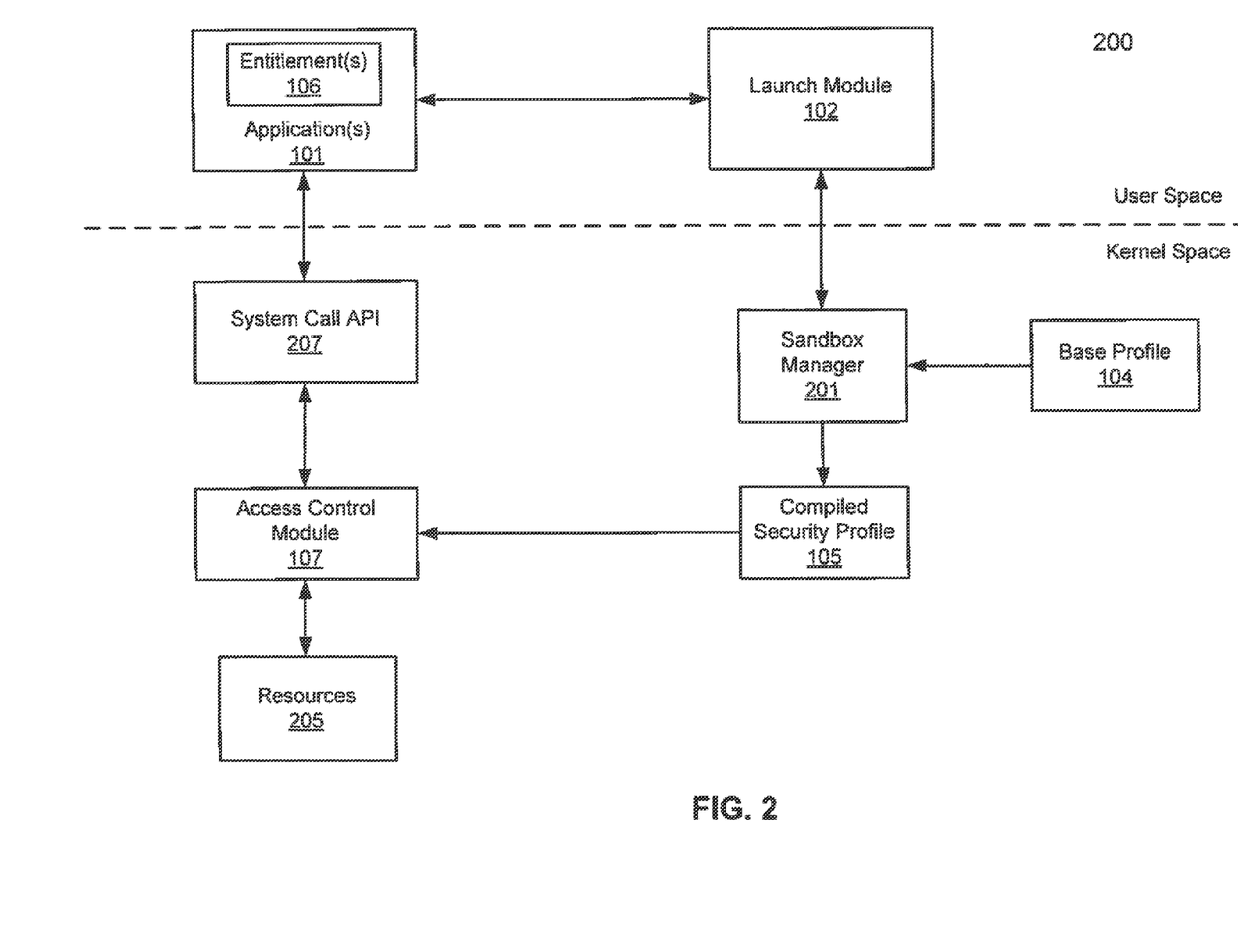
FIG. 2 is a block diagram illustrating a system for operating an application in a restricted operating environment according to another embodiment of the invention.

FIG. 2 is a block diagram illustrating a system for operating an application in a restricted operating environment according to one embodiment of the invention. System 200 may be implemented as part of system 100 of FIG. 1. Referring to FIG. 2, system 200 includes, but is not limited to, application launch module 102 for launching one or more applications 101 and an access control module 107 for managing accessing resources 205 of a data processing system. As described above, in response to a request for launching application 101, launch module 102 is to obtain zero or more extended entitlements 106 from application 101. Based on extended entitlements 106 and base profile 104, a profile compiler associated with sandbox manager 201 (e.g., profile compiler 108) is to compile security profile 105 for application 101, where base profile 104 is a statically and previously compiled profile that is shared by other applications (e.g., base profile plus one or more profile extensions). Sandbox manager 201 is to configure a sandboxed operating environment and launch module 102 and application 101 within the sandboxed operating environment to be executed therein as a sandboxed process.

Subsequently, when application 101 is to access resources 205 via system call or application programming interface (API) 207, access control module 107 is to manage or enforce the rules set forth in security profile 105 associated with application 101. Application 101 can access resources 205 only if security profile 105 allows; otherwise, it will be prevented from accessing resources 205 by access control module 107.

A sandboxed process refers to a process that has been isolated within a restricted operating environment (e.g., sandbox) that limits the process to a set of predefined resources. Each sandboxed process may be associated with a set of dedicated system resources, such as, for example, a dedicated memory space, a dedicated storage area, or a virtual machine, etc. One of the purposes of sandboxing an application is to isolate the application from accessing other unnecessary or unrelated system resources of another application or a system component, such that any damage caused by the application would not spill over to other areas of the system.

To provide security, an application may be "contained" by restricting its functionality to a subset of operations and only allowing operations that are necessary for the proper operation, i.e., operation according to its intended functionality. One method to implement a limited set of policies for each application is to contain, or "sandbox" the application. Sandboxing of an application or process can be achieved using operating system level protection to provide containment and to enforce security policies, such as policies that restrict the ability of the application to take actions beyond those functions needed for it to provide its intended functionalities. When an application has been sandboxed during execution, the application is executed as a sandboxed process or thread within the system that is contained within a sandbox (also referred to as an application container), in which it cannot access certain system resources or another territory (e.g., sandbox) of another application, subject to a security profile associated with the sandboxed application, which is referred to as a sandboxed process or a sandboxed application.

A sandboxed process is the application or other program for which security containment will be implemented. In many cases, a sandboxed process is a user application, but it could be another program implemented on the computing device such as a daemon or a service. To increase security and provide an efficient mechanism, portions of the security system are implemented or executed in a kernel space. In addition, a monitor process module (not shown) is executed in a separate memory space from the sandboxed processes to further insulate them from each other. In particular, a sandboxed process is restricted from accessing memory outside of its process space and is further prohibited from spawning a non-sandboxed process. For example, a security profile of a sandboxed process may include a rule or policy that denies the sandboxed process from using certain system calls, which may be a mechanism that allows processes to alter each other's address spaces. In some embodiments a policy may prevent a program from performing certain actions based on the state of an external accessory connected to the computing device, e.g. if an accessory of a specific type or identity is connected; is disconnected, or is connected and is in (or is not in) a specific mode. For example, an application may only be allowed to communicate over an externally accessible data bus if an accessory that meets certain criteria is connected to the data bus and is in a receptive mode.

Figure 3:
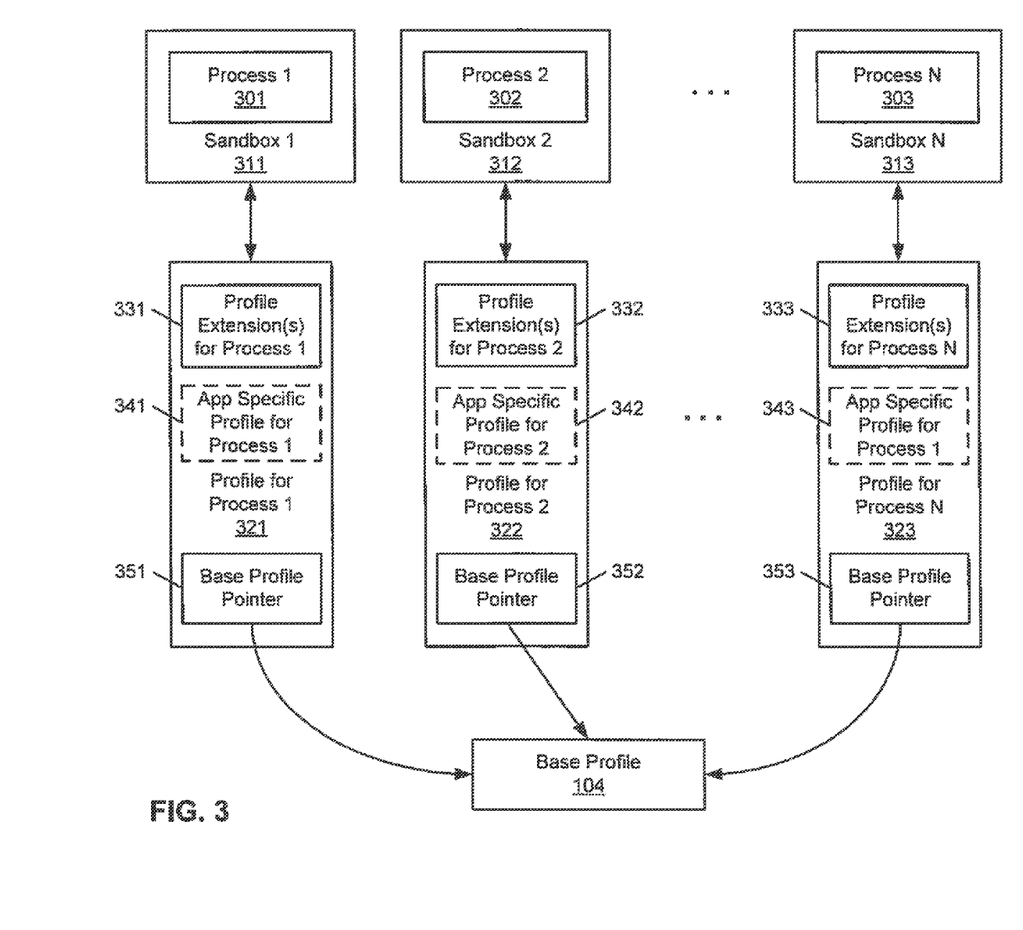
FIG. 3 is a block diagram illustrating security profile architecture according to one embodiment of the invention.

Although only application 101 is shown in FIG. 2, system 200 may be able to launch multiple applications, compile multiple profile extensions, and share the same base profile 105 amongst the applications. Each security profile for each of the applications includes its own one or more profile extensions based on its own extended entitlements and shares base profile 105 with the rest of applications as shown in FIG. 3. Referring to FIG. 3, processes 301-303 are launched and executed within sandboxed operating environments 311-313 as sandboxed processes, respectively. Sandboxes 311-313 are configured based on security profiles 321-323, respectively. As described above, each of profiles 321-323 may be compiled based on zero or more profile extensions (e.g., profile extensions 331-333), an optional application profile (e.g., application profiles 341-343), and common base profile 104.

An optional application specific profile refers to a secondary profile that contains entitlements that are specific for a particular application. In one embodiment, each profile extension specifics a specific resource in an absolute manner, such as a specific path to a storage location (e.g., hardcoded path). An application specific profile may include a resource relative to another resource. For example, an application specific profile may specify that an application is entitled to access a particular resource of its parent process, which is not typically specified in a profile extension because it cannot be hardcoded. According to another embodiment, there is a one-to-one relationship between a profile extension and an extended entitlement, while an application specific profile may contain information associated with multiple entitlements of a particular application.

Figure 4:
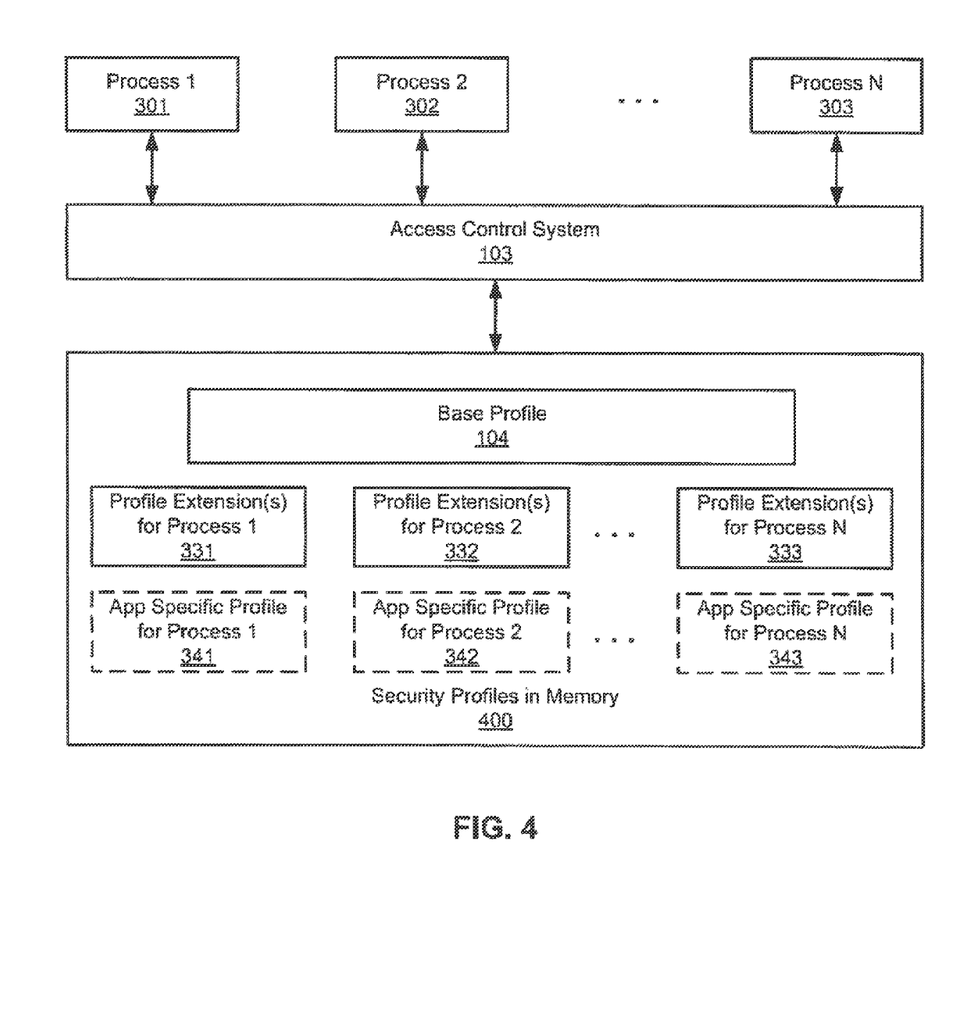
FIG. 4 is a block diagram illustrating security profile architecture according to another embodiment of the invention.

In one embodiment, instead of physically maintaining a copy of base profile 104 within their respective profiles 321-323, a pointer or link (e.g., pointers 351-353) is maintained in each of profiles 321-323. As a result, less memory may be required to maintain all of profiles 321-323 for processes 301-303, as shown in FIG. 4. Referring to FIG. 4, when all of the security profiles corresponding to processes 301-303 are loaded in memory 400, only one instance of base profile 104 is loaded, while each of the security profiles of processes 301-303 includes a link or pointer referencing base profile 104. Contrary to a conventional system, which requires multiple copies of base profile 104 loaded, only one copy of base profile 104 is loaded in memory 400. In one embodiment, base profile 104 may be around 60 KB (kilobytes), while an application specific profile or a profile extension may be in a range of 4 KB. As a result, less memory is needed to maintain all of the profiles for processes 301-303.

Figure 5:
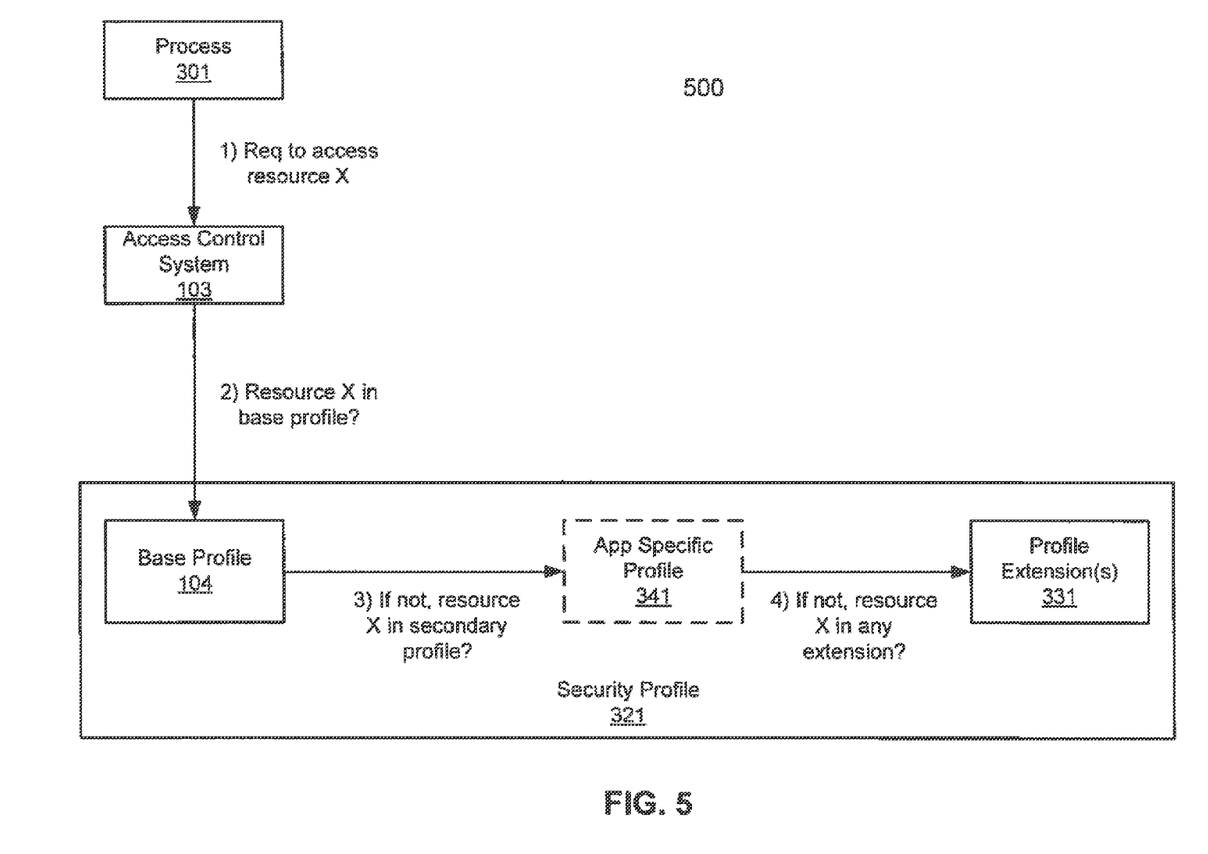
FIG. 5 is a process flow illustrating a process for resource access control according to one embodiment of the invention.

FIG. 5 is a process flow illustrating a process for resource access control according to one embodiment of the invention. Referring to FIG. 5, in one embodiment, when process 301 requests accessing a particular resource, in this example resource X, access control system 103 is to examine base profile 104 to determine whether base profile allows process 301 to access resource X. If not, access control system 103 will examine optional application specific profile 341 and if still not allowed then each of the profile extensions 331 to determine whether there is an extension or exception to allow process 301 to access resource X.

According to another embodiment, dependent upon the specific configuration, application specific profile 341 and/or profile extensions may be used to override the default settings in base profile 104. For example, when access control system 103 examines base profile 104, it may further examine whether application profile 341 and/or profile extensions 331 have specified the same rule or rules that are configured in base profile 104. If so, the same rules in application profile 341 and/or profile extensions 331 may be applied instead of the one in base profile 104.

Figure 6:
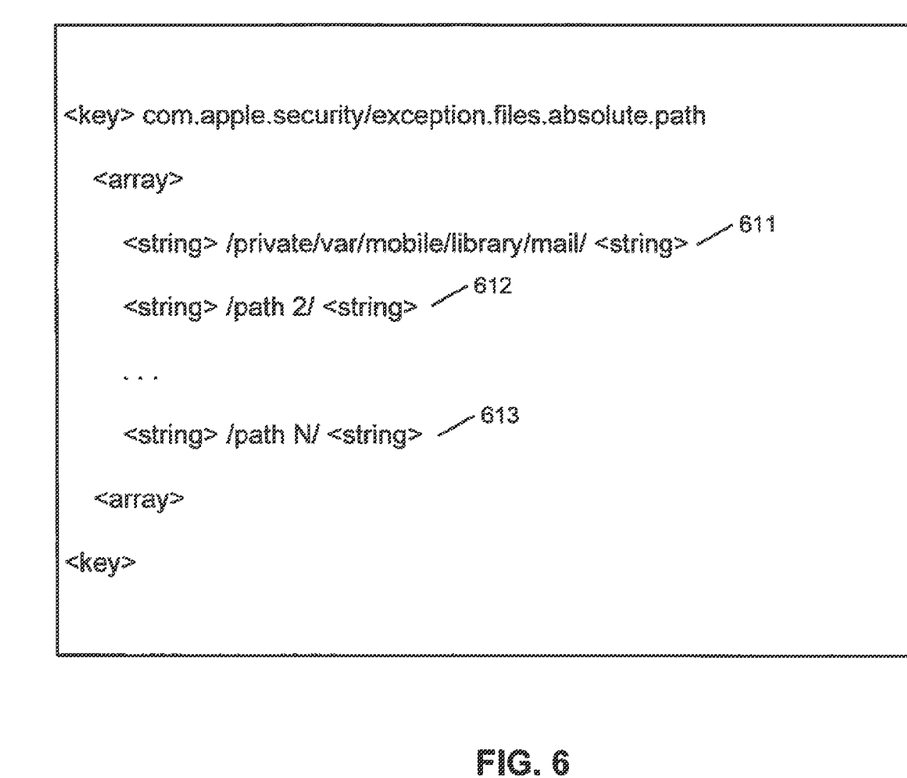
FIG. 6 is a diagram illustrating an example of extended entitlements of an application according to one embodiment of the invention.

FIG. 6 is a diagram illustrating an example of extended entitlements of an application according to one embodiment of the invention. Referring to FIG. 6, in this example, the extended entitlements are specified in a scripting language such as extensible markup language (XML). Such entitlements 600 may be encoded within an executable image of an application and authorized and signed by a proper authority. In this example, extended entitlements 600 includes absolute paths 611-613 as entitlements. Each of these extended entitlements 611-613 is then compiled into a profile extension, one profile extension for one extended entitlement. Alternatively, all these entitlements 611-613 may be compiled into an application specific profile. The profile extensions and/or application specific profile are then utilized in conjunction with a base profile to form a logical profile for an application, as described above.

Figure 7:
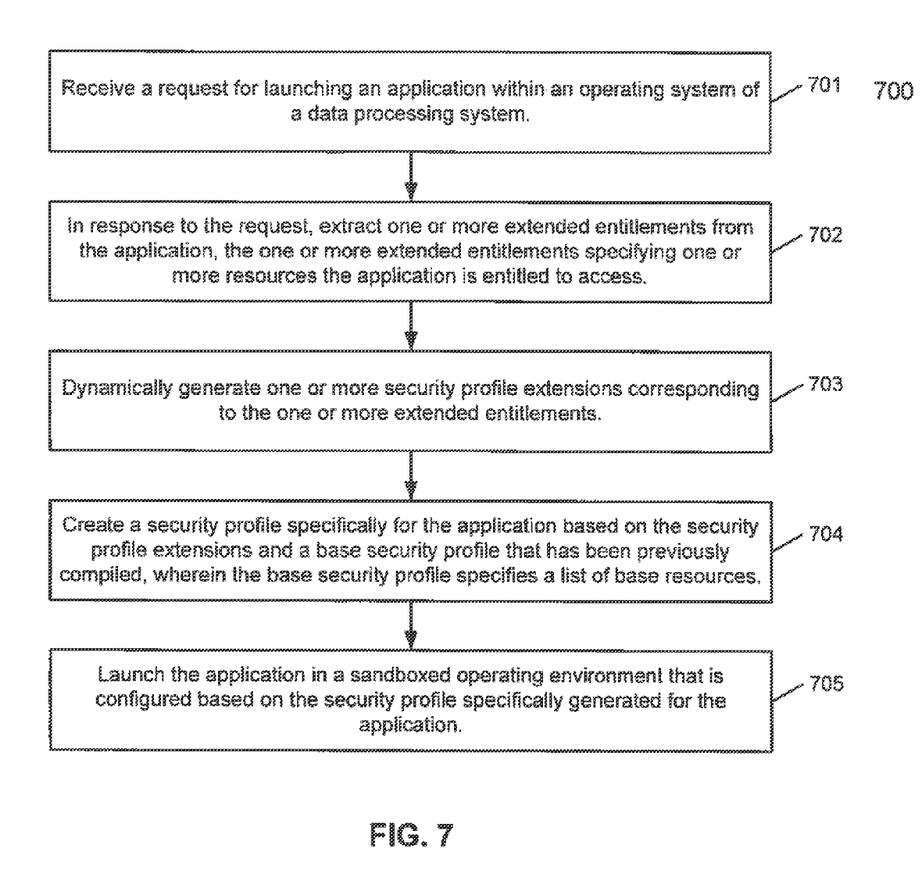
FIG. 7 is a flow diagram illustrating a method for generating a security profile to restrict resource usage of an application according to one embodiment of the invention.

FIG. 7 is a flow diagram illustrating a method for generating a security profile to restrict resource usage of an application according to one embodiment of the invention. Method 700 may be performed by processing logic which may include software, hardware, or a combination thereof. For example, method 700 may be performed by systems 100 and 200 in FIGS. 1 and 2. Referring to FIG. 7, at block 701, processing logic receives a request for launching an application within an operating system of a data processing system. In response to the request, at block 702, processing logic obtains or extracts one or more extended entitlements from the application, for example, from an executable image of the application. The extended entitlements specify one or more resources the application is entitled to access. At block 703, processing logic dynamically generates one or more security profile extensions corresponding to the one or more extended entitlements. At block 704, processing logic creates a security profile specifically for the application based on the security profile extensions and a base security profile. The base security profile was previously compiled. The base security profile specifies a list of base resources that are shared by some other applications. At block 705, the application is launched in a sandboxed operating environment, which is configured based on the security profile specifically generated for the application based on the profile extensions and the base security profile.

Figure 8:
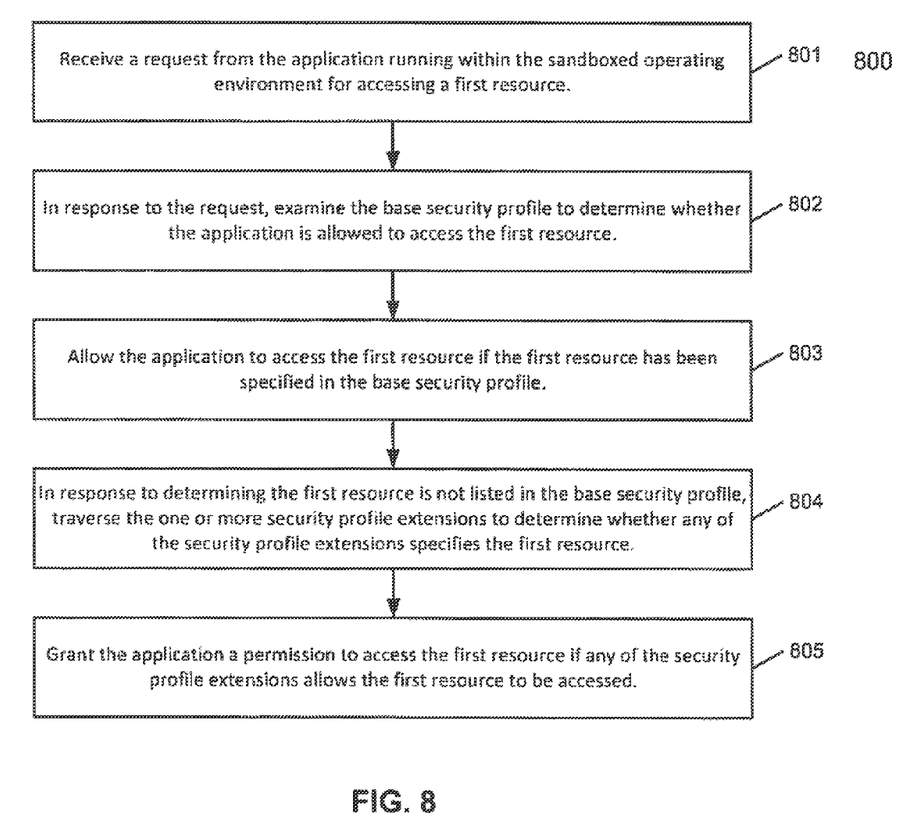
FIG. 8 is a flow diagram illustrating a method for enforcing resource access based on a security profile according to one embodiment of the invention.

FIG. 8 is a flow diagram illustrating a method for enforcing resource access based on a security profile according to one embodiment of the invention. Method 800 may be performed by processing logic which may include software, hardware, or a combination thereof. For example, method 800 may be performed by system 500 in FIG. 5. Referring to FIG. 8, at block 801, processing logic receives a request from an application running within sandboxed environment for accessing a first resource. In response to the request, at block 802, processing logic examines a base security profile to determine whether the application is allowed to access the first resource. At block 803, if the base security profile permits, the application is allowed to access the first resource. In response to determining the first resource is not listed in the base security profile, at block 804, processing logic traverses one or more profile extensions and/or an application specific profile associated with the application to determine whether any of the profile extensions specifies the first resource. At block 805, if any of the profile extensions and/or application specific profile allows, a permission is granted to the first application to access the first resource.

Figure 9:
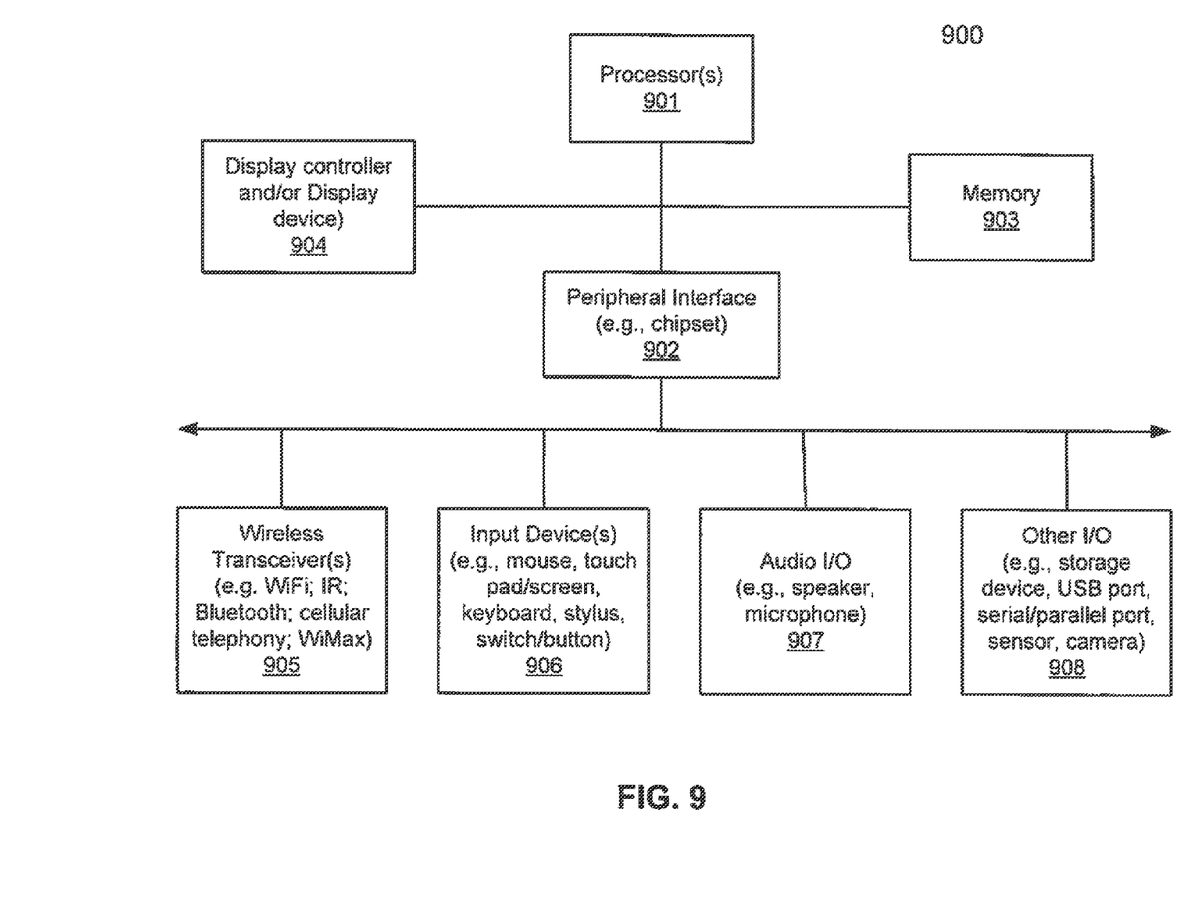
FIG. 9 is a block diagram of a data processing system, which may be used with one embodiment of the invention.

FIG. 9 is a block diagram illustrating an example of a data processing system which may be used with one embodiment of the invention. For example, system 900 may represents any of data processing systems described above performing any of the processes or methods described above, such as systems 100, 200, and 500 in FIGS. 1-2 and 5. System 900 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 9, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device, For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 9 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
    in response to a request for launching an application within an operating system of a data processing system, obtaining one or more extended entitlements for the application, the one or more extended entitlements specifying one or more extended resources the application is entitled to access;
    generating one or more security profile extensions corresponding to the one or more extended entitlements;
    creating a security profile specifically for the application based on the one or more security profile extensions and a base security profile that has been previously compiled, wherein the base security profile specifies a list of one or more base resources, wherein the one or more extended resources and the base resources are provided within the data processing system and specified by the security profile extensions and the base security profile respectively; and
    executing the application in a sandboxed operating environment that is configured based on the security profile specifically generated for the application.

2. The method of claim 1, wherein the base security profile is a common security profile shared by a plurality of applications running within the operating system.

3. The method of claim 2, wherein the base security profile is statically compiled as a part of standard system components of the operating system.

4. A computer-implemented method, comprising:
    obtaining one or more extended entitlements for an application within an operating system of a data processing system, the one or more extended entitlements specifying one or more extended resources the application is entitled to access;
    generating one or more security profile extensions corresponding to the one or more extended entitlements;
    creating a security profile specifically for the application based on the one or more security profile extensions and a base security profile that has been previously compiled, wherein the base security profile specifies a list of one or more base resources, wherein the one or more extended resources and the base resources are provided within the data processing system and specified by the security profile extensions and the base security profile respectively; and
    executing the application in a sandboxed operating environment that is configured based on the security profile specifically generated for the application.

5. The method of claim 4, wherein the base security profile is a common security profile shared by a plurality of applications running within the operating system.

6. The method of claim 5, wherein the base security profile is statically compiled as a part of standard system components of the operating system.

7. The method of claim 5, wherein the security profile of the application is a logical security profile linked with the base security profile and the one or more security profile extensions.

8. The method of claim 7, wherein the base security profile and the one or more security profile extensions as a whole provide an entire list of resources that the application is entitled to access.

9. The method of claim 7, further comprising dynamically generating a secondary security profile for the application based on entitlements obtained for the application, wherein the base security profile, the secondary security profile, and the one or more security profile extensions as a whole provide an entire list of resources that the application is entitled to access.

10. The method of claim 9, wherein the secondary security profile specifies a resource that is relative to another resource, and wherein each of the one or more security profile extension specifies an absolute resource.

11. The method of claim 4, further comprising:
    receiving a request from the application running within the sandboxed operating environment for accessing a first resource;
    in response to the request, examining the base security profile to determine whether access is allowed to the first resource; and
    allowing the application to access the first resource if the first resource has been specified in the base security profile.

12. The method of claim 11, further comprising:
    in response to determining the first resource is not listed in the base security profile, traversing the one or more security profile extensions to determine whether any of the security profile extensions specifies the first resource; and
    granting the application a permission to access the first resource if any of the security profile extensions allows access to the first resource.

13. The method of claim 6, wherein the extended entitlements were encoded within an executable image of the application and signed by a predetermined authority.

14. A non-transitory machine-readable medium having instructions stored therein, which when executed by a data processing system, cause the data processing system to perform a method, the method comprising:
    obtaining one or more extended entitlements for an application within an operating system of the data processing system, the one or more extended entitlements specifying one or more extended resources the application is entitled to access;
    generating one or more security profile extensions corresponding to the one or more extended entitlements;

creating a security profile specifically for the application based on the one or more security profile extensions and a base security profile that has been previously compiled, wherein the base security profile specifies a list of one or more base resources, wherein the one or more extended resources and the base resources are provided within the data processing system and specified by the security profile extensions and the base security profile respectively; and executing the application in a sandboxed operating environment that is configured based on the security profile specifically generated for the application.

15. The non-transitory machine-readable medium of claim 14, wherein the base security profile is a common security profile shared by a plurality of applications running within the operating system.

16. The non-transitory machine-readable medium of claim 15, wherein the base security profile is statically compiled as a part of standard system components of the operating system.

17. The non-transitory machine-readable medium of claim 15, wherein the security profile of the application is a logical security profile linked with the base security profile and the one or more security profile extensions.

18. The non-transitory machine-readable medium of claim 17, wherein the base security profile and the one or more security profile extensions as a whole provide an entire list of resources that the application is entitled to access.

19. The non-transitory machine-readable medium of claim 17, wherein the method further comprises dynamically generating a secondary security profile for the application based on entitlements obtained for the application, wherein the base security profile, the secondary security profile, and the one or more security profile extensions as a whole provide an entire list of resources that the application is entitled to access.

20. The non-transitory machine-readable medium of claim 19, wherein the secondary security profile specifies a resource that is relative to another resource, and wherein each of the one or more security profile extension specifies an absolute resource.

21. The non-transitory machine-readable medium of claim 14, wherein the method further comprises:
receiving a request from the application running within the sandboxed operating environment for accessing a first resource;
in response to the request, examining the base security profile to determine whether access is allowed to the first resource; and
allowing the application to access the first resource if the first resource has been specified in the base security profile.

22. The non-transitory machine-readable medium of claim 21, wherein the method further comprises:
in response to determining the first resource is not listed in the base security profile, traversing the one or more security profile extensions to determine whether any of the security profile extensions specifies the first resource; and
granting the application a permission to access the first resource if any of the security profile extensions allows access to the first resource.

23. The non-transitory machine-readable medium of claim 16, wherein the extended entitlements were encoded within an executable image of the application and signed by a predetermined authority.

24. A data processing system, comprising:
one or more processors; and
a memory coupled to the one or more processors for storing instructions, which when executed from the memory, cause the one or more processors to
obtain one or more extended entitlements for an application within an operating system of the data processing system, the one or more extended entitlements specifying one or more extended resources the application is entitled to access,
generate one or more security profile extensions corresponding to the one or more extended entitlements,
create a security profile specifically for the application based on the one or more security profile extensions and a base security profile that has been previously compiled, wherein the base security profile specifies a list of one or more base resources, wherein the one or more extended resources and the base resources are provided within the data processing system and specified by the security profile extensions and the base security profile respectively, and
execute the application in a sandboxed operating environment that is configured based on the security profile specifically generated for the application.

25. The system of claim 24, wherein the base security profile is a common security profile shared by a plurality of applications running within the operating system.

26. The system of claim 25, wherein the base security profile is statically compiled as a part of standard system components of the operating system.

27. The system of claim 25, wherein the security profile of the application is a logical security profile linked with the base security profile and the one or more security profile extensions.

28. The system of claim 27, wherein the base security profile and the one or more security profile extensions as a whole provide an entire list of resources that the application is entitled to access.

29. The system of claim 27, wherein the processor is further to dynamically generate a secondary security profile for the application based on entitlements obtained for the application, wherein the base security profile, the secondary security profile, and the one or more security profile extensions as a whole provide an entire list of resources that the application is entitled to access.

30. The system of claim 29, wherein the secondary security profile specifies a resource that is relative to another resource, and wherein each of the one or more security profile extension specifies an absolute resource.

31. The system of claim 24, wherein the processor is further to:
receive a request from the application running within the sandboxed operating environment for accessing a first resource;
in response to the request, examine the base security profile to determine whether the access is allowed to first resource; and
allow the application to access the first resource if the first resource has been specified in the base security profile.

32. The system of claim 31, wherein the processor is further to:
in response to determining the first resource is not listed in the base security profile, traverse the one or more security profile extensions to determine whether any of the security profile extensions specifies the first resource; and grant the application a permission to access the first resource if any of the security profile extensions allows access to the first resource.

33. The system of claim 26, wherein the extended entitlements were encoded within an executable image of the application and signed by a predetermined authority.

* * * * *